United States Patent
Kriesel et al.

(10) Patent No.: US 6,588,511 B1
(45) Date of Patent: Jul. 8, 2003

(54) HOOFED ANIMAL PAD

(75) Inventors: Matt Kriesel, Melrose, WI (US); Bruce Lyle, Aubrey, TX (US)

(73) Assignee: Impact Gel Corporation, Melrose, WI (US)

(*) Notice: Subject to any disclaimer, the term of this patent is extended or adjusted under 35 U.S.C. 154(b) by 0 days.

(21) Appl. No.: 10/094,030

(22) Filed: Mar. 7, 2002

(51) Int. Cl.⁷ ................ A01L 7/02; A01L 7/00
(52) U.S. Cl. ........................... 168/14; 168/26
(58) Field of Search .................. 168/12, 14, 26

(56) References Cited

U.S. PATENT DOCUMENTS

| | | | | |
|---|---|---|---|---|
| 371,301 A | * | 10/1887 | Burhans | 168/26 |
| 710,999 A | * | 10/1902 | Powers | 168/26 |
| 757,473 A | * | 4/1904 | Lemon | 168/26 |
| 3,747,684 A | * | 7/1973 | Wallen | 168/26 |
| 4,513,825 A | * | 4/1985 | Murphy | 168/12 |
| 5,509,484 A | * | 4/1996 | Landi et al. | 168/14 |

* cited by examiner

Primary Examiner—Charles T. Jordan
Assistant Examiner—Elizabeth Shaw
(74) Attorney, Agent, or Firm—Womble Carlyle Sandridge & Rice, PLLC

(57) ABSTRACT

Disclosed is a resilient pad to be placed between a foot and a shoe of a hoofed animal comprising a first region substantially defined by the area of the shoe and a second region substantially defined by an area enclosed by the shoe. The second region contains the shock absorbing area. The first region of the pad resides between the hoof and shoe and does not provide substantial shock absorbing properties. Further disclosed is a resilient pad comprising two hemispheres for a cloven hoofed animal.

30 Claims, 2 Drawing Sheets

HOOFED ANIMAL PAD

FIELD OF THE INVENTION

The present invention generally relates to pads for hoofed animals and in particular it relates to pads for horses and cattle to aid in preventing injury to the hoof.

BACKGROUND

The hooves of domestic animals, especially equids, are dynamic, specialized epidermal structures subjected to many different forces and environments, as well as methods and ideas for care of them. All hooves are composed of a hard epidermal covering known by many names such as hoof-wall and insensitive horn. Secondly, beneath the wall is the sensitive corium composed of vessels, nerves, collagen, elastin, and other cellular and proteinaceous components. This architecture encases the third phalanx bone and its associated tendons, ligaments, and sesamoid bone. Traditional hoof care has consisted of trimming the wall and applying a shoe of metal or hard plastic to the wall to protect it from abrasions and chipping. Modifications are made and various single piece pads of leather, plastic, or rubber are applied to enhance support and protection of the basic shoe. The wall has classically been viewed as the weight bearing structure upon which the horse stands. Field observation of feral horses and pastured horses has led to differing thoughts on the horse's foot and the function of its components.

For many years, farriers have inserted pads of various shapes, sizes and materials between a horse's hoof and a horseshoe. The primary purposes for using such pads are: to protect the sole of the horse's hoof; to act as shock absorbers and reduce concussion when the horse's hoof and horseshoe strike the ground; to change the angle of the hoof relative to the ground; and to prevent snowballing.

Hoof pads are generally shaped to be secured, mechanically and/or chemically, between a horseshoe and at least the outer, peripheral portion of the horse's hoof. The two most common shapes of hoof pads are "full" pads and "rim" pads, although other shapes are possible. "Full," sometimes called "flat," pads cover the entire bottom surface of the horse's hoof and are used to protect the hoof and to keep it free of snow and debris. "Rim" pads fit between a horseshoe and the hoof, and are generally about the same size and shape as a horseshoe so that only the outer, peripheral portion of the hoof is covered. Rim pads are used to put more distance between the sole and the ground. Shock absorbing pads, which are used to reduce concussion and vibrations to the hoof and leg structures of the horse, have been made in both full and rim styles and have been made from a variety of materials.

Currently, foot pads are either a single piece molded rubber/plastic unit, or they are created by combining two components to form a pad material which occupies the solar arch between the branches of the shoe. The latter is not pre-prepared, and is designed to fit flush or just above the plane of the ground contact surface of the shoe. None of these products can exist exclusively without a shoe or a mesh to secure them in place.

Furthermore, in the treatment of lameness and other diseases of the musculoskeletal system of horses and other domestic animals, it has been proposed to provide a resilient rubber layer between the bottom of the hoof of the animal and a shoe. Although treatments of this kind have been tried, they have not proven entirely successful both because the resilient material chosen has not been effective in reducing shock to the animal's musculoskeletal system and also because some of the resilient materials, although effective at absorbing shock, have not proven to be sufficiently dimensionally stable to hold up when placed between the shoe and hoof of a horse or other animal.

It has been known to apply orthotic devices in the form of tapering wedges under the heel portion of a hoof to elevate and support the rear or heel portion. Such wedges have in the past extended the full width of the hoof and have been secured by the same nails that hold the shoe in place.

What is needed is a pad for a hoofed animal that protects the inner portion of the hoof that is neither a "rim" or "full" cushion.

SUMMARY

The present invention provides a resilient pad to be placed between a foot and a shoe of a hoofed animal comprising a first region substantially defined by the area of the shoe and a second region substantially defined by an area enclosed by the shoe. The second region contains a shock absorbing area. The first region typically resides between the hoof and shoe and does not provide substantial shock absorbing properties.

An embodiment of the resilient pad may comprise a first region substantially defined by the area of the shoe and a second region having an envelope containing an elastomeric material. The second region resides in the area enclosed by the shoe. The pad typically includes a top and bottom layer wherein the top layer is in contact with the foot or hoof and the bottom layer is in contact with both the ground and shoe. The layers may be formed from a woven material. The elastomeric material can comprise a polymeric gel having a cross linked elastomeric polymer. The polymeric gel is typically a two part polymer formed from polybutadiene, a plasticizer, a prepolymer, a stabilizer and an isocyanate. Furthermore, the first region has a profile region which is less than the profile of the second region.

In a further embodiment, the pad has a second region defined by the inner edge of the shoe. The second region contains an envelope having an aggregate inside an envelope. The aggregate may be sand or other substantially hard particles such as solid polymer particles, hollow beads, foamed polymer particles, perlite, calcium carbonate, clay, dolomite, sand, barium sulfate, mica, silica, talc, gypsum, wollastonite, calcite, aluminum trihydrate, zinc oxide, zinc sulfate, and mixtures thereof.

An additional embodiment includes a pad having a second region defined by the inner edge of the shoe having a fluid filled envelope. The fluid may be a gas such as air or a liquid such as water or a liquid polymer. The fluid is typically contained in an impervious envelope which may be formed from an elastic polymeric sheet. The pad further includes a top and bottom portion formed from a woven or nonwoven material.

A further embodiment includes a pad for a cloven hoofed animal, such as in the case of a cow. In this embodiment, the resilient pad for a hoofed animal comprises a first hemisphere having a first shock absorbent envelope and a second hemisphere having a second shock absorbent envelope. The hemispheres may be joined at the ends to create a "V" shaped wedge such that the "toes" of the animal may move freely.

Additionally, a method is provided for treating a foot of a hoofed animal comprising the steps of affixing to the foot of the hoofed animal a resilient pad. The resilient pad comprises a first region substantially defined by the area of a shoe and a second region having a shock absorbing envelope. The second region is substantially defined by an area enclosed by the shoe. The method may further include affixing a shoe to the foot of the hoofed animal.

DRAWINGS

DETAILED DESCRIPTION

Figure 1:
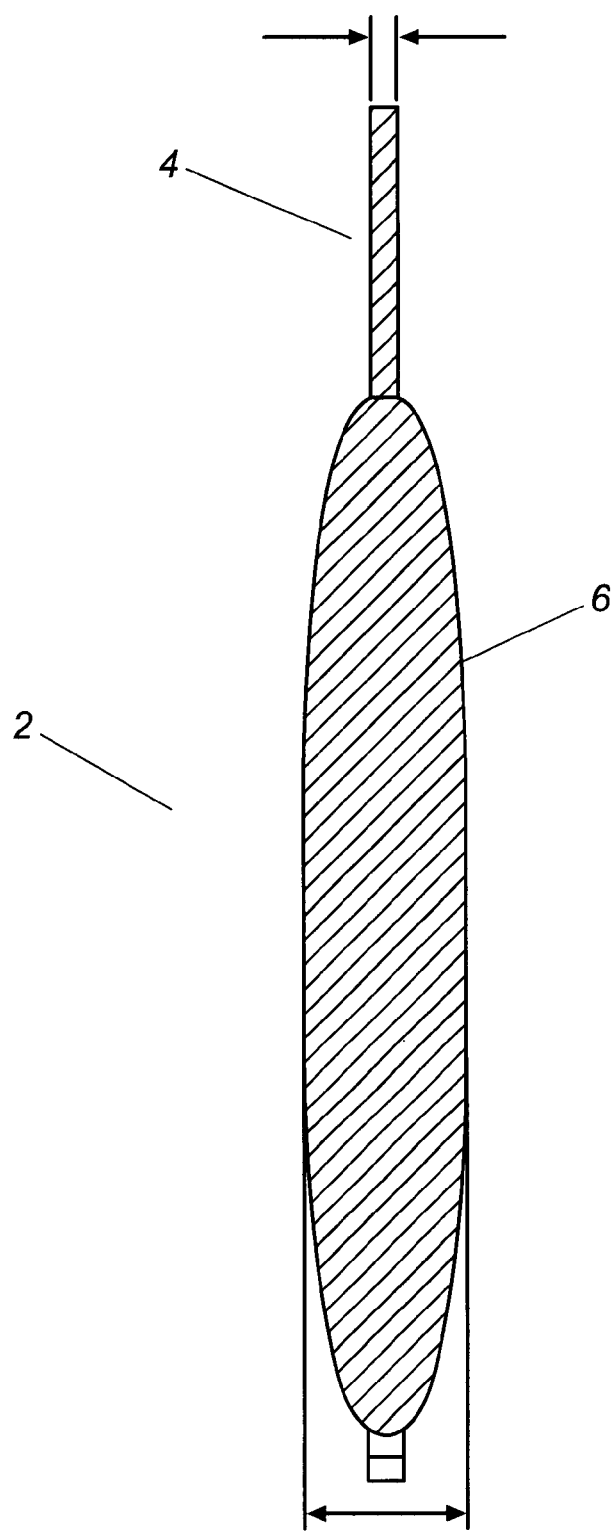
FIG. 1 illustrates a side view of the resilient pad showing both the first and second regions.
Figure 2:
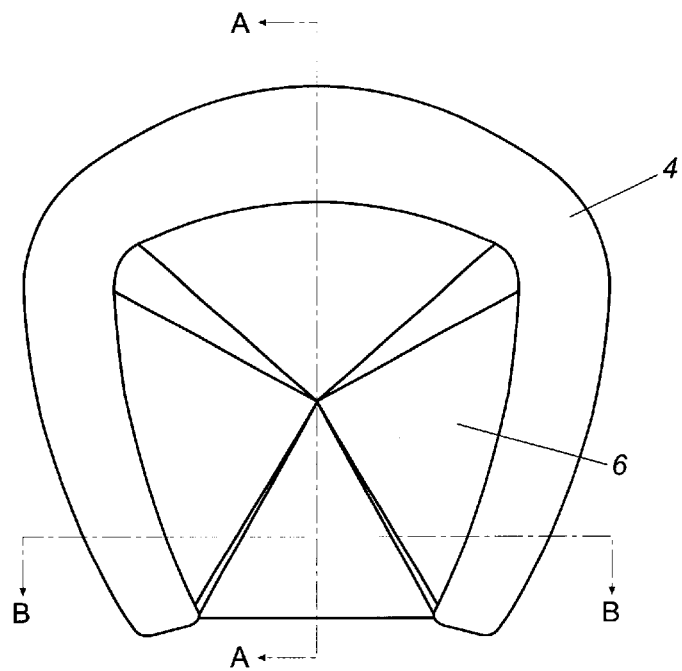
FIG. 2 depicts a top or bottom view of the resilient pad showing the first and second regions.

The present invention provides a resilient pad 2 which can be placed between a foot and a shoe of a hoofed animal. Typically, the hoofed animal is a horse and the shoe is a typical "U" shaped horse shoe. The pad comprises two main regions. The first region 4 has a profile similar to that of the shoe and does not possess substantial shock absorbing properties. The second region 6 has a profile defined by the inner edge of the shoe and comprises a shock absorbing envelope.

The pad 2 can be applied beneath a shoe, nailed or glued to the foot singularly. The impact absorbing material is self-contained and may set just below the plane of the ground contact surface of the wall or shoe. The pad 2 can enhance the digital cushion in the palmar/plantar aspect of the hoof. The pad 2 can dissipate the initial energy of impact, thus lessening the concussion of the wall and bony column at impact.

The pad 2 may provide both impact energy absorption and impact vibration dampening. Vibration is typically transmitted up the bony column and through the tendon and ligament structures of the lower limb. Impact energy absorption also reduces the energy absorbing requirements of the cartilage surfacing all joints of the limbs.

In greater detail, the resilient pad 2 comprises a first region 4 substantially defined by the area of a shoe affixed to the animal. Typically, a shoe is nailed to the hoof of the animal. The first region 4 may be fastened to the hoof and held in place to the hoof by the shoe as the shoe is nailed to the hoof. Nails pass though both the shoe and the pad 2 and then into the hoof of the animal. Of course the shoe may be fastened to the hoof of the animal by most any method such as by pins, screws or other mechanical devices. Additionally, it is contemplated that the resilient pad 2 may be attached to the foot or hoof of the animal without attaching a shoe to the hoof. In such a case, the pad 2 may be affixed to the hoof mechanically or by an adhesive.

Furthermore, the first region 4 of the pad 2 is substantially defined by the area of the shoe attached to the hoof. The first region 4 is not only limited to the profile of the shoe and may either be greater than or less than the profile of the shoe. The second region 6 containing the shock absorbent envelope is substantially defined by the area of the inner edge of the shoe. However, the second region 6 is not limited to the previously described boundary.

The pad 2 contains at least two regions. The first of the two regions has substantially little shock absorbing properties and the second of the two regions has a shock absorbing area. The term "substantially little shock absorbing properties" may be defined as having shock absorbing properties which are less than that of the other or second region 6.

The pad 2 typically comprises an envelope formed from a polymeric material such as a resilient plastic. The envelope may be formed of other materials such as woven or nonwoven materials. The envelope may be formed from a material that is substantially impervious to fluids. The pad 2 also has a top and bottom surface. The top surface is in contact with the hoof and the bottom surface typically contacts the ground when worn by the animal. The top and bottom surfaces may be formed from different materials. Both woven and nonwoven materials may be used to form the top and bottom surfaces. Typically, the surfaces are formed from a durable material capable of withstanding forces placed upon the pad 2 when the animal is in motion.

Figure 3:
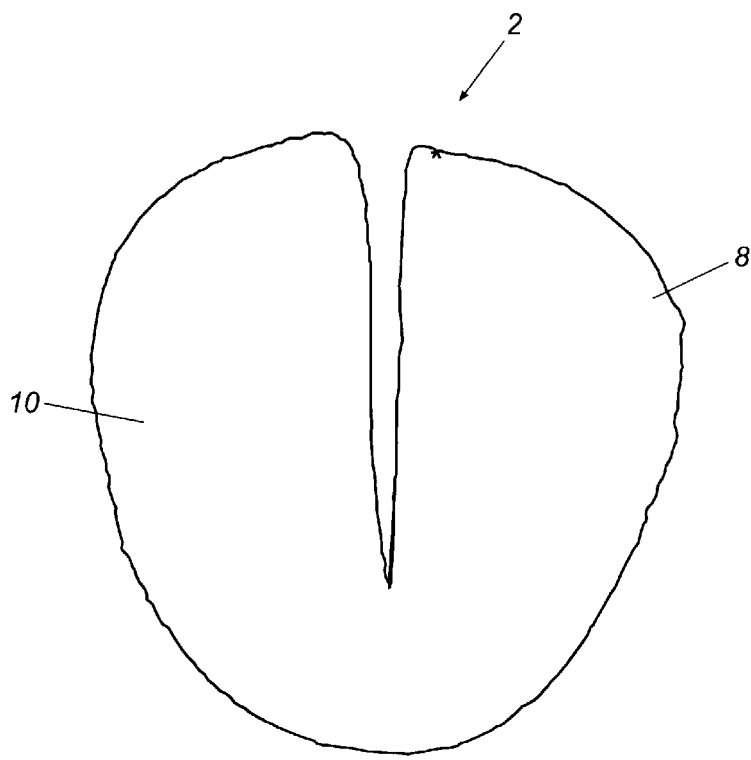
FIG. 3 illustrates an embodiment for a cloven hoofed animal having two hemispheres.

A further embodiment includes a resilient pad 2 adapted for a cloven hoofed animal, such as a cow. In this embodiment, the resilient pad 2 is divided into at least a first hemisphere 8 and a second hemisphere 10, which is further illustrated in FIG. 3. The hemispheres may either be joined at one end as illustrated or may be applied to the hoof as separated units. The pad 2 and/or hemispheres may be applied to the hoof in any conventional manner such as an adhesive or mechanical device. The hemispheres comprise an envelope as described. When the hemispheres are joined at one end the pad 2 has a "V" shaped wedge open space which allows the animals "toes" to move freely.

In an embodiment, the envelope may contain an elastomeric material. Most any elastomeric material is acceptable. Example elastomeric material includes thermoplastic elastomers, crosslinked elastomers and noncrosslinked rubbery materials. The elastomeric material may be silicone, ethylene acrylic, polyacrylate, fluorocarbon, fluorosilicone, hydrogenated nitrile, nitrile, epychlorohydrin and ethylene propylene diene.

Furthermore, the elastomeric material may comprise a polymeric gel having a crosslinked elastomeric polymer. The polymeric gel is typically a two part polymer formed from polybutadiene, a plasticizer, a prepolymer, a stabilizer and an isocyanate. Furthermore, the first region 4 has a profile region which is less than the profile of the second region 6.

A further embodiment includes the pad 2 having a second region 6 defined by the inner edge of the shoe with an envelope containing an aggregate. The aggregate may be sand or other substantially hard particles such as solid polymer particles, hollow beads, foamed polymer particles, perlite, calcium carbonate, clay, dolomite, sand, barium sulfate, mica, silica, talc, gypsum, wollastonite, calcite, aluminum trihydrate, zinc oxide, zinc sulfate, and mixtures thereof.

An additional embodiment includes a pad 2 having a second region 6 defined by the inner edge of the shoe having a fluid filled envelope. The fluid may be a gas such as air or a liquid such as water or a liquid polymer. The fluid is typically encased in a substantially impervious envelope. The envelope may be formed from an elastic polymeric sheet. The pad 2 may further have a top and bottom portion formed from a woven or nonwoven material.

A method is also provided for treating a foot of a hoofed animal comprising the steps of affixing to the foot of the hoofed animal a resilient pad 2. The resilient pad 2 comprises a first region 4 substantially defined by the area of a shoe and a second region 6 substantially defined by an area enclosed by the shoe. The second region 6 has a shock absorbing envelope. The method may further include affixing a shoe to the foot of the hoofed animal.

While Applicants have set forth embodiments as illustrated and described above, it is recognized that variations may be made with respect to disclosed embodiments.

Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A resilient pad to be placed between a foot and a shoe of a hoofed animal comprising:
   a first region substantially defined by the area of the shoe; and
   a second region having a shock absorbent envelope comprising a polymeric gel, and the second region being substantially defined by an area enclosed by the shoe.

2. The resilient pad of claim 1, wherein the pad comprises a top layer and bottom layer.

3. The resilient pad of claim 2, wherein the top layer is in contact with the foot and is substantially rigid.

4. The resilient pad of claim 2, wherein the bottom layer comprises a woven fabric.

5. The resilient pad of claim 1, wherein the polymeric gel comprises polybutadiene, a plasticizer, a prepolymer and a stabilizer.

6. The resilient pad of claim 5, wherein the prepolymer comprises an isocyanate.

7. The resilient pad of claim 5, wherein the stabilizer comprises an alkyl tin compound.

8. The resilient pad of claim 1, wherein the first region has a first profile and the second region has a second profile, wherein the first profile of the first region is less than the second profile of the second region.

9. A resilient pad to be placed on a foot of a hoofed animal comprising:
   at least a first and second region, wherein the second region having a shock absorbent envelope comprising a polymeric gel and the first region having substantially no shock absorbing properties.

10. A resilient pad to be placed between a foot and a shoe of a hoofed animal comprising:
    a first region substantially defined by the area of the shoe; and
    a second region having a fluid filled envelope, and the second region being substantially defined by an area enclosed by the shoe.

11. The resilient pad of claim 10, wherein the fluid is a gas or liquid.

12. A resilient pad to be placed between a foot and a shoe of a hoofed animal comprising:
    a first region substantially defined by the area of the shoe; and
    a second region having an aggregate filled envelope, and the second region being substantially defined by an area enclosed by the shoe.

13. The resilient pad of claim 12, wherein the aggregate is selected from the group consisting of sand, solid polymer particles, hollow beads, foamed polymer particles, perlite, calcium carbonate, clay, dolomite, sand, barium sulfate, mica, silica, talc, gypsum, wollastonite, calcite, aluminum trihydrate, zinc oxide, zinc sulfate, and mixtures thereof.

14. A method of treating a foot of a hoofed animal comprising the steps of:
    affixing to the foot of the hoofed animal a resilient pad comprising a first region substantially defined by the area of a shoe; and
    a second region having a shock absorbing envelope comprising a polymeric gel, and the second region being substantially defined by an area enclosed by the shoe.

15. The method of claim 14, further including affixing the shoe to the foot of the hoofed animal.

16. The method of claim 14, wherein the polymeric gel comprises a crosslinked elastomenc polymer.

17. The method of claim 14, wherein the polymeric gel comprises polybutadiene, a plasticizer, a prepolymer and a stabilizer.

18. The method of claim 17, wherein the prepolymer comprises an isocyanate.

19. The method of claim 14, wherein the stabilizer comprises an alkyl tin compound.

20. The method of claim 14, wherein the first region has a first profile and the second region has a second profile, wherein the first profile of the first region is less than the second profile of the second region.

21. A resilient pad for a hoofed animal comprising:
    a first hemisphere having a first shock absorbent envelope and a second hemisphere having a second shock absorbent envelope.

22. The resilient pad of claim 21, wherein the pad comprises a top layer and bottom layer.

23. The resilient pad of claim 22, wherein the top layer is in contact with the foot and is substantially rigid.

24. The resilient pad of claim 22, wherein the bottom layer comprises a woven fabric.

25. The resilient pad of claim 21, wherein the shock absorbent envelopes comprise a resilient material.

26. The resilient pad of claim 21, wherein the resilient material is selected from the group consisting of thermoplastic elastomers, crosslinked elastomers, noncrosslinked rubbery materials and combinations thereof.

27. The resilient pad of claim 26, wherein the elastomeric material comprises a polymeric gel having a crosslinked elastomeric polymer.

28. The resilient pad of claim 27, wherein the polymeric gel comprises polybutadiene, a plasticizer, a prepolymer and a stabilizer.

29. The resilient pad of claim 28, wherein the prepolymer comprises an isocyanate.

30. The resilient pad of claim 28, wherein the stabilizer comprises an alkyl tin compound.

* * * * *